(12) United States Patent
Clerc et al.

(10) Patent No.: US 9,057,823 B2
(45) Date of Patent: Jun. 16, 2015

(54) METHOD FOR PRODUCING A POLARISING LENS AND CORRESPONDING POLARISING LENS

(75) Inventors: Didier Clerc, Bellegarde sur Valserine (FR); Franck Ledien, Echallon (FR)

(73) Assignee: BNL EUROLENS, Bellegarde sur Valserine (FR)

( * ) Notice: Subject to any disclaimer, the term of this patent is extended or adjusted under 35 U.S.C. 154(b) by 2 days.

(21) Appl. No.: 14/000,790

(22) PCT Filed: Mar. 16, 2012

(86) PCT No.: PCT/EP2012/054729
§ 371 (c)(1),
(2), (4) Date: Aug. 21, 2013

(87) PCT Pub. No.: WO2012/126859
PCT Pub. Date: Sep. 27, 2012

(65) Prior Publication Data
US 2013/0329185 A1    Dec. 12, 2013

(30) Foreign Application Priority Data

Mar. 18, 2011   (FR) .................... 11 52281

(51) Int. Cl.
| | | |
|---|---|---|
| G02C 3/00 | (2006.01) | |
| G02C 7/12 | (2006.01) | |
| G02B 1/08 | (2006.01) | |
| B29D 11/00 | (2006.01) | |
| B29C 51/14 | (2006.01) | |
| B29C 51/42 | (2006.01) | |

(52) U.S. Cl.
CPC ............... *G02B 1/08* (2013.01); *B29C 51/422* (2013.01); *B29D 11/00634* (2013.01); *B29D 11/0073* (2013.01); *B29C 51/14* (2013.01); *B29D 11/00009* (2013.01)

(58) Field of Classification Search
CPC ............. G02C 7/02; G02C 7/12; G02C 7/10; G02C 7/04; G02B 1/041; G02B 5/3033; G02B 5/23
USPC .............. 351/159.01, 159.56, 159.61, 159.71
See application file for complete search history.

(56) References Cited

U.S. PATENT DOCUMENTS

2010/0110542 A1*   5/2010  Sasaki et al. .................. 359/488

FOREIGN PATENT DOCUMENTS

WO    WO 2006/094313 A2    9/2006

* cited by examiner

*Primary Examiner* — James Greece
(74) *Attorney, Agent, or Firm* — Muncy, Geissler, Olds & Lowe, P.C.

(57) ABSTRACT

A polarizing lens is constituted in succession by a mechanical support layer made of polycarbonate, the intermediate layer made of polyvinyl alcohol, and an outer layer made of cellulose triacetate. The invention also provides a method of fabricating such a lens.

8 Claims, 1 Drawing Sheet

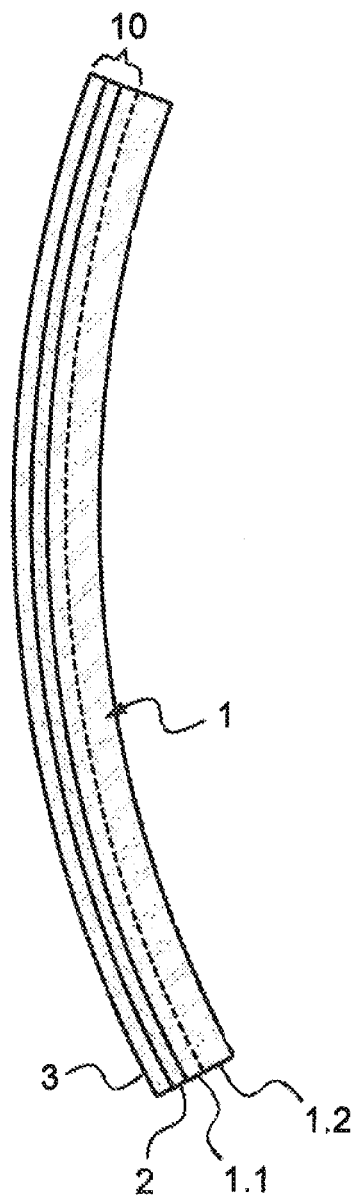

METHOD FOR PRODUCING A POLARISING LENS AND CORRESPONDING POLARISING LENS

BACKGROUND OF THE INVENTION

The present invention relates to a method of making polarizing lenses, and to the polarizing lens obtained by said method. More particularly, the polarizing lenses obtained by the method of the invention are suitable for use in a frame to form a pair of eyeglasses such as a pair of correcting or non-correcting sunglasses, of wrap-around or of conventional type, or a pair of correcting or non-correcting protective eyeglasses.

BRIEF SUMMARY OF THE INVENTION

The method of the invention is particularly adapted to making non-correcting lenses. The term "non-correcting lens" is used to mean a lens without any astigmatic or spherical power, such as the lenses concerned by standards relating to sunglasses or to protective glasses, as in standard EN 1836.

Eyeglasses having lenses incorporating a polarizing filter are in very widespread use and, by way of example, they are used in all activities performed in locations, such as at sea or in snowy regions, that include zones with strong reflections of light. Such strong reflections can impede vision, and in certain circumstances can constitute sources or dazzling. Such glasses are also most advantageous for driving vehicles, since they make it possible to limit or even to eliminate the perception of interfering reflections on windshields, for example on car windshields.

In such eyeglasses, use is made of polarizing lenses comprising a polarizing filter that is generally made in the form of a film of polyvinyl alcohol (PVA) polymer. Such polarizing films are conventionally obtained by incorporating dichroic dye molecules and/or crystals of dichroic iodine in a films based on polyvinyl alcohol, and then in stretching the film uniaxially so as to orient the dichroic dye molecules and/or the dichroic iodine crystals in the stretching direction. The term "dichroic dye" is used to mean a species that may be molecular or crystalline in nature and that presents preferred absorption of visible electromagnetic radiation in one particular spatial orientation. Polarizing films as obtained in this way are inexpensive and possess optical quality that is compatible with numerous applications, and in particular ophthalmic applications.

The PVA film is then covered in one or more layers of protective material in order to form the lens.

A method of fabricating a polarizing lens is disclosed in document WO 2006/094313.

An object of the invention is to provide a structure that constitutes an alternative to prior art structures, that presents good durability, and that can be made at least in part by injection molding. The method of the invention is thus dedicated to making a thermoplastic polarizing lens.

To this end, a polarizing lens is provided that comprises, in succession: a mechanical support layer comprising a polycarbonate thermoplastic polymer forming a rear face of the lens; an intermediate layer of polyvinyl alcohol; and an outer layer of cellulose triacetate forming a front face of the lens.

The polycarbonate thus provides mechanical strength, while the cellulose triacetate provides resistance to chemical interactions. In use on an eyeglass frame, the outer layer faces away from the wearers face. The properties of the cellulose triacetate and of the polycarbonate then combine in such a manner that those materials protect each other mutually from at least some forms of external attack.

Such lenses, and their method of fabrication, also present a considerable advantage relative to prior art lenses. Polarizing lenses based on polycarbonate thermoplastic are made in particular by using a polarizing film comprising a front layer of birefringent polycarbonate, a film of polyvinyl alcohol, and a rear layer of stretched polycarbonate, which rear layer is caused to fuse with the polycarbonate representing the material constituting the lens while performing the injection molding method. It can readily be understood that the constraints associated with using a layer of birefringent polycarbonate and a layer of stretched polycarbonate lead to limitations in terms of available materials that are suitable for constituting the polarizing film, in terms of the conditions in which the material is worked, and also in terms of the properties and the performance of the polarizing lenses as obtained in that way.

The fabrication method of the invention comprises the steps of:
  preheating a laminated film comprising an outer layer of cellulose triacetate (CTA), an intermediate layer of polyvinyl alcohol (PVA), and an outer layer of polycarbonate (PC), with different temperatures for the outer layers of the laminated film;
  thermoforming the laminated film while heating the outer layers differently;
  placing the thermoformed film in a mold having the shape of the lens in such a manner that the triacetate outer layer extends against a wall of the mold;
  injecting polycarbonate into the mold in such a manner that the layer of polycarbonate fuses with the injected polycarbonate to form the mechanical support layer of the lens; and
  unmolding the lens as formed in this way.

The different heating of the film makes it possible to perform thermoforming that is adapted to the differences of the materials making up the outer layers of the film. In addition, the different preheating makes it possible to facilitate the thermoforming step, and thus to improve the final quality of the lens.

Other characteristics and advantages of the invention appear on reading the following description of a particular, nonlimiting embodiment of the invention.

BRIEF DESCRIPTION OF THE DRAWINGS

Reference is made to the accompanying FIGURE showing a lens in accordance with the invention in cross-section.

DETAILED DESCRIPTION OF THE PREFERRED EMBODIMENTS

The invention relates to a polarizing lens that may be correcting or non-correcting, and that comprises in succession: a mechanical support layer 1 made of polycarbonate (PC); an intermediate layer 2 made of polyvinyl alcohol (PVA); and an outer layer 3 made of cellulose triacetate (CTA). The adhesive layers that might be necessary for maintaining cohesion between the layers are not mentioned. The invention preferably relates to a non-correcting polarizing lens.

The mechanical support layer 1 forms the rear face of the lens and is arranged to give the lens its mechanical properties, and in particular its stiffness.

The thickness of the mechanical support layer is thus defined as a function of the looked-for stiffness and mechanical strength. It is also defined in accordance with the optical properties of the lens.

The outer layer 3 forms the front face of the lens.

The rear face and the front face of the lens may optionally be covered in any coating that is conventionally used in the field of ophthalmic lenses in order to provide some additional function to the polarizing lens. Among the functional coatings that may be arranged on one and/or the other face of the lens, mention may be made in nonlimiting manner of coatings that give the lens an additional anti-shock function, an anti-reflection function, an anti-abrasion function, an anti-dirtying function, an anti-fogging function, an antistatic function, or a combination of two or more of these functions.

The method includes a step of taking a laminated film 10 comprising the outer layer 3 of cellulose acetate, the intermediate layer 2 of polyvinyl alcohol, and an outer layer 1.1 of polycarbonate.

The film 10 is then cut out around an outline corresponding to that of the lens.

The cutout film 10 is then curved. This operation is performed by thermoforming.

Thermoforming is preceded by drying that serves to improve the behavior of the film during the thermoforming and to stabilize the colors of the film 10.

In the invention, after being dried, the film 10 is preheated in order to facilitate thermoforming. During the During preheating, the outer layers are heated to different temperatures.

The thermoforming proper is performed in a mold having a concave portion and a convex portion. The film 10 is placed in the mold in which the concave and convex portions, each contact with a respective one of the outer layers, are heated to different temperatures. The film 10 is deformed as a result of pressure being applied in the presence of heat to the mold portions.

Advantageously, in this thermoforming method, the pressure exerted in order to deform the film is exerted in progressive and controlled manner. This controlled application of pressure by using appropriate means within the mold serves to control deformation.

The heating temperatures take account of the glass transition temperatures of the materials of the outer layers, and in particular they are adjusted as a function of this physical parameter.

In a preferred implementation, the film 10 is also preheated within said mold.

The method is followed by the step of placing the thermoformed film 10 in an injection mold having the shape of the lens.

In an alternative implementation of the method, a step of drying the thermoformed film may be performed before the step in which the thermoformed film is arranged in the injection mold, in particular when the film is not used immediately after the thermoforming step.

The curved film 10 is placed in the injection mold in such a manner that the outer layer 3 of cellulose triacetate extends against the wall of the mold, while a gap remains between the outer layer 1.1 and the facing wall of the mold.

Thereafter, thermoplastic polycarbonate is injected into said gap in the mold so that the outer layer 1.1 of polycarbonate fuses with the injected thermoplastic polycarbonate 1.2 in order to form the mechanical support layer 1 of the lens. In the FIGURE, it should be observed that the outer polycarbonate layer 1.1 is shown separated from the injected polycarbonate layer 1.2 by a dashed line in order to explain the method of performing the invention. In reality, in the finished lens there normally appears only one layer of polycarbonate since the outer layer 1.1 of polycarbonate from the film 10 fuses with the injected polycarbonate 1.2 to form a single layer. The injection operation parameters, and more particularly the temperature of the injected polycarbonate, the speed and/or the pressure of injection, and the position of the or each injection point, are determined in specific manner and are associated with the nature of the polarizing film used in the method. Specifically, the polycarbonate is injected at a temperature that is lower than the temperature that is used conventionally.

Once the polycarbonate has cooled sufficiently, the lens as formed in this way is un-molded.

Naturally, the invention is not limited to the implementation described, but covers any variant coming within the ambit of the invention as defined by the claims.

In particular, the lens may include a correcting portion.

The lens may have its final shape, or it may be circular in shape. If it is circular, it is the optician who needs to machine the lens (generally by milling) in order to give it a shape that is adapted to the frame in which it is to be mounted.

The invention is applicable to eyeglasses of conventional type having two lenses, and also to wrap-around type glasses having a single lens.

The invention claimed is:

1. A method of making a lens, the method comprising the steps of:
   preheating a laminated film comprising an outer layer of cellulose triacetate (CTA), an intermediate layer of polyvinyl alcohol (PVA), and an outer layer of polycarbonate (PC), with different temperatures for the outer layers of the laminated film;
   thermoforming the laminated film while heating the outer layers differently;
   placing the thermoformed film in a mold having the shape of the lens in such a manner that the cellulose triacetate outer layer extends against a wall of the mold;
   injecting polycarbonate into the mold in such a manner that the layer of polycarbonate fuses with the injected polycarbonate to form the mechanical support layer of the lens; and
   unmolding the lens as formed in this way.

2. The method according to claim 1, wherein the preheating is preceded by drying the film.

3. The method according to claim 1, wherein the thermoforming is performed in a mold comprising a convex part and a concave part.

4. The method according to claim 3, wherein, during the thermoforming, the convex part and the concave part are heated to different temperatures.

5. The method according to claim 1, wherein the deformation of the film during the thermoforming step is performed by applying controlled pressure.

6. The polarizing lens obtained by the method according to claim 1, the lens comprising in succession: a mechanical support layer comprising a polycarbonate thermoplastic polymer forming a rear face of the lens; and intermediate layer of polyvinyl alcohol; and an outer layer of cellulose triacetate forming a front face of the lens.

7. The polarizing lens according to claim 6, which lens is a correcting polarizing lens.

8. A The polarizing lens according to claim 6, which lens is a non-correcting polarizing lens.

\* \* \* \* \*